US009189689B2

(12) United States Patent
Chandraker et al.

(10) Patent No.: US 9,189,689 B2
(45) Date of Patent: Nov. 17, 2015

(54) ROBUST SCALE ESTIMATION IN REAL-TIME MONOCULAR SFM FOR AUTONOMOUS DRIVING

(71) Applicant: NEC Laboratories America, Inc., Princeton, NJ (US)

(72) Inventors: Manmohan Chandraker, Santa Clara, CA (US); Shiyu Song, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/451,280

(22) Filed: Aug. 4, 2014

(65) Prior Publication Data

US 2015/0117709 A1 Apr. 30, 2015

Related U.S. Application Data

(60) Provisional application No. 61/897,440, filed on Oct. 30, 2013, provisional application No. 62/026,061, filed on Jul. 18, 2014, provisional application No. 62/026,184, filed on Jul. 18, 2014.

(51) Int. Cl.
G06K 9/00 (2006.01)
G06K 9/46 (2006.01)

(52) U.S. Cl.
CPC .............. *G06K 9/00791* (2013.01); *G06K 9/46* (2013.01); *G06K 2009/4666* (2013.01)

(58) Field of Classification Search
CPC ................ G06K 9/00791; G06K 9/46; G06K 2009/4666; G06K 2209/40; G06T 3/005
See application file for complete search history.

(56) References Cited

U.S. PATENT DOCUMENTS

2005/0200624 A1\* 9/2005 Lachner et al. ............... 345/427
2006/0008183 A1\* 1/2006 Johansen ..................... 383/61.2
2008/0316862 A1\* 12/2008 Bernecky et al. ............. 367/131

\* cited by examiner

*Primary Examiner* — Brian Le
(74) *Attorney, Agent, or Firm* — Joseph Kolodka

(57) ABSTRACT

A method for performing three-dimensional (3D) localization requiring only a single camera including capturing images from only one camera; generating a cue combination from sparse features, dense stereo and object bounding boxes; correcting for scale in monocular structure from motion (SFM) using the cue combination for estimating a ground plane; and performing localization by combining SFM, ground plane and object bounding boxes to produce a 3D object localization.

22 Claims, 6 Drawing Sheets

General Training Mechanism Used for Cue Combination $f_i$ is the scoring function for each cue.
$\pi$ is the ground plane.
$S_\pi$ is the range in which $\pi$ is varied.

- For each training frame $k$:
  - For various $\pi_j \in S_\pi$, compute $y_j = f_i(\pi_j)$.
  - Fit a model $\mathcal{A}_i^k$ to observations $(\pi_j, y_j)$. Parameters $a_i^k$ of model $\mathcal{A}_i^k$ reflect belief in accuracy of cue $i$. (For instance, when $\mathcal{A}$ is a Gaussian, a is its variance.)
  - Compute error $e_i^k = |\arg\min_\pi f_i(\pi) - \pi^{*k}|$, where $\pi^{*k}$ is the ground truth ground plane in frame $k$.
- Quantize model parameters $a_i^k$, for $k = 1, \cdots, F$, into $L$ centers $c_i^1, \cdots, c_i^L$.
- Cluster errors $e_i^k$ according to quantized parameters $c_i^l$ and let $v_i^l$ be the cluster variance, for $l = 1, \cdots, L$.
- Fit a model $C_i$ to observations $(c_i^l, v_i^l)$.

FIG. 2

Ground Plane Estimation With 3D Points

1. Detect FAST corners in a region of interest in the immediate foreground (middle third of the lower half of the image).
2. Match using ORB descriptors to similar region in the previous image.

3. Perform triangulation to recover the 3D location (x, y, z) of these feature matches.
4. Height of a 3D point = y cos(p) - z sin(p), where p = camera pitch angle (known).

5. Robust 1-point RANSAC to estimate ground plane height:
   (a) For every 3D point
   (b) height of point is h0, initialize sum = 0
   (c) For all other 3D points, find h - h0
   (d) sum = sum + exp(-50 * (h - h0))
6. Return height of point with largest sum.

FIG. 3

Ground Plane Estimation With Guided Dense Stereo

1. To compute height h and surface normal $n = (n1, n2, n3)$

2. Initialize h to height from method in 301, n1 to $\cos(p)$, n3 to $-\sin(p)$
   (n2 is determined by n1 and n3, using unit norm of n)

3. Cost function computation:
   (a) Given any hypothesized h, n1, n3, compute homography between frames at time t and t+1
       $H \approx R + (1/h) \, \text{tn}^\wedge T$, where (R, t) is the relative camera pose (b) Map pixels in frame t to frame t+1
   (c) Bilinear interpolation for subpixel accurate values
   (d) Compute sum of absolute values of intensity difference, SAD, between left and right frame.

4. Use Nelder-Mead simplex method to optimize for h, n1 and n3.

FIG. 4

Ground Plane Estimation Using 2D Object Bounding Boxes

1. To compute ground pitch angle n3 in $n = (n1, n2, n3)$.
2. Initialize n3 to calibration n3.
3. Cost function computation:
   a. Given a 2D bounding box, we can compute the object height h through the ground plane by back-projecting 2D pixel to 3D.
   b. A prior object height h_prior is given, for example (1.5m for a sedan car).
4. Use Nelder-Mead simplex method to optimize for n3 that minimize:
   $(h - h\_prior)^2$.

FIG. 5

Training a Model for Effectiveness of 3D Points Cue (a) From training data, for each discrete bin of estimated sum, compute variance of height errors (b) Fit a curve (straight line) to the scatter plot of above variance against the bin centers (c) Compute a single variance estimate for all errors in n1 and n3 (since they are fixed here).

FIG. 6

Training a Model for Effectiveness of Dense Stereo Cue (a) Fix n1 and n3, for every h, compute the $1 - 1.5^{\wedge}(-SAD)$ of the corresponding homography mapping (b) Fit a 1D-Gaussian to the above curve, call its variance s1.

(c) Compute histogram of height errors, binned over the variance s1

(d) Compute the variance s2 of height errors in each bin of the histogram (e) Fit a curve (straight line) to the scatter plot of s1 against s2.

(f) Similarly repeat (b)-(e) for n1 and n3.

FIG. 7

Training a Model for Effectiveness of 2D Object Bounding Boxes Cue a. Fit a mixture of Guassian model to the detection score. The variables in the mixture of Gaussian model are x, y, width and height of the 2D bounding box.

b. Record the y and height covariance sigma_y and sigma_h in the mixture of Gaussian model. Compute sigma_d = (sigma_y * sigma_h) / (sigma_y + sigma_h).

c. Compute histogram of n3 errors, binned over the variance sigma_d.

d. Compute the variance sigma_e of the height errors in each bin of the histogram.

e. Fit a curve (straight line) to the scatter plot of sigma_e against sigma_d.

FIG. 8

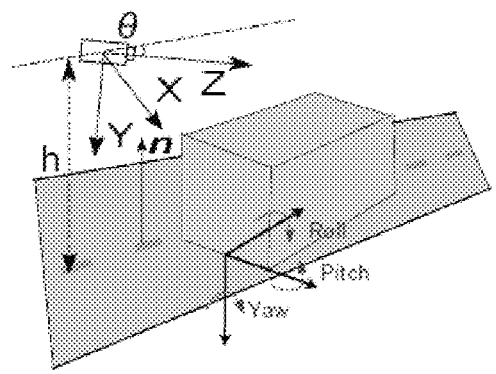

FIG. 9

ROBUST SCALE ESTIMATION IN REAL-TIME MONOCULAR SFM FOR AUTONOMOUS DRIVING

The present application claims priority to Provisional Application Ser. Nos. 61/897,440 filed Oct. 30, 2013, 62/026,061 filed Jul. 18, 2014 and 62/026,184 filed Jul. 18, 2014, the contents of which are incorporated by reference.

BACKGROUND

The present invention relates to systems for processing structure from motion (SFM).

Vision-based structure from motion (SFM) is rapidly gaining importance for autonomous driving applications. Monocular SFM is attractive due to lower cost and calibration requirements. However, unlike stereo, the lack of a fixed baseline leads to scale drift, which is the main bottleneck that prevents monocular systems from attaining accuracy comparable to stereo. Robust monocular SFM that effectively counters scale drift in real-world road environments has significant benefits for mass-produced autonomous driving systems.

A popular way to tackle scale drift is to estimate height of the camera above the ground plane. Prior monocular SFM works like use sparse feature matching for ground plane estimation. However, in autonomous driving, the ground plane corresponds to a rapidly moving, low-textured road surface, which renders sole reliance on such feature matches impractical. Also, conventional monocular SFM systems correct for scale by estimating ground plane from a single cue (sparse feature matching). Prior cue combination frameworks do not adapt the weights according to per-frame visual data. Prior localization systems use a fixed ground plane, rather than adapting it to per-frame visual estimates.

SUMMARY

A method for performing three-dimensional (3D) localization requiring only a single camera by capturing images from only one camera; generating a cue combination from sparse features, dense stereo and object bounding boxes; correcting for scale in monocular structure from motion (SFM) using the cue combination for ground plane estimation; and performing localization by combining SFM, ground plane and object bounding boxes to produce the 3D object localization.

Implementations can use a combination of monocular real-time SFM, a cue combination framework and object tracking to solve the problem. Applications include autonomous driving and driving safety. Our implementations can apply one or more of the following:
(a) Using tracked bounding boxes, determine the regions of the image that are background (non-moving objects) and use monocular SFM to estimate the camera pose and the ground plane.
(b) On the objects, perform a dense optical flow estimation to better track them.
(c) Estimate the ground plane using multiple cues: 3D points, dense stereo and 2D object bounding boxes.
(d) Learn models that indicate per-frame relative importance of various cues.
(e) Combine the ground plane estimates within a Kalman filter mechanism.
(f) Estimated ground plane is used to correct the monocular SFM scale drift.
(g) Estimated ground plane is used to find the 3D bounding box that encloses the object.

Advantages of the above embodiments may include one or more of the following. The data-driven framework for monocular ground plane estimation achieves outstanding performance in real-world driving. This yields high accuracy and robustness for real-time monocular SFM over long distances, with results comparable to state-of-the-art stereo systems on public benchmark datasets. Further, we also show significant benefits for applications like 3D object localization that rely on an accurate ground plane. Other advantages of our solution may include the following:
(a) More accurate (since we use multiple cues for scale correction)
(b) More flexible (our framework extends across many different types of cues)
(c) More robust (we combine cues based on their per-frame relative importance)
(d) Faster (the system is real-time and does not use expensive motion segmentation).

BRIEF DESCRIPTION OF THE DRAWINGS

FIGS. 2-8 shows in more details the modules in the system of FIG. 1.
FIG. 9 shows one arrangement for a camera height determination.

DESCRIPTION

A real-time monocular SFM system is disclosed that corrects for scale drift using a cue combination framework for ground plane estimation, yielding accuracy comparable to stereo over long driving sequences. Our ground plane estimation uses multiple cues like sparse features, dense inter-frame stereo and (when applicable) object detection. A data-driven mechanism is proposed to learn models from training data that relate observation covariances for each cue to error behavior of its underlying variables. During testing, this allows per-frame adaptation of observation covariances based on relative confidences inferred from visual data. Our framework significantly boosts not only the accuracy of monocular self-localization, but also that of applications like object localization that rely on the ground plane. Experiments on the KITTI dataset demonstrate the accuracy of our ground plane estimation, monocular SFM and object localization relative to ground truth, with detailed comparisons to conventional systems.

First, we incorporate cues from multiple methods and second, we combine them in a framework that accounts for their per-frame relative confidences, using models learned from training data. The system incorporates cues from dense stereo between successive frames and 2D detection bounding boxes (for the object localization application). The dense stereo cue vastly improves camera self-localization, while the detection cue significantly aids object localization. To combine cues, a data-driven framework is used. During training, we learn models that relate the observation covariance for each cue to error behaviors of its underlying variables, as observed in visual data. At test time, fusion of the covariances predicted by these models allows the contribution of each cue to adapt on a per-frame basis, reflecting belief in its relative accuracy.

The significant improvement in ground plane estimation using our framework is demonstrated below. In turn, this leads to excellent performance in applications like monocular SFM and 3D object localization. On the KITTI dataset, our real-time monocular SFM achieves rotation accuracy up to 0.0054° per frame, even outperforming several state-of-the-art stereo systems. Our translation error is a low 3.21%, which is also comparable to stereo and to the best of our knowledge, unmatched by other monocular systems. We also exhibit high robustness directly attributable to accurate scale correction. Further, we demonstrate the benefits of our ground estimation for 3D object localization. Our work naturally complements tracking-by-detection frameworks to boost their localization accuracy—for instance, we achieve over 6% improvement in 3D location error over the system.

Figure 1:
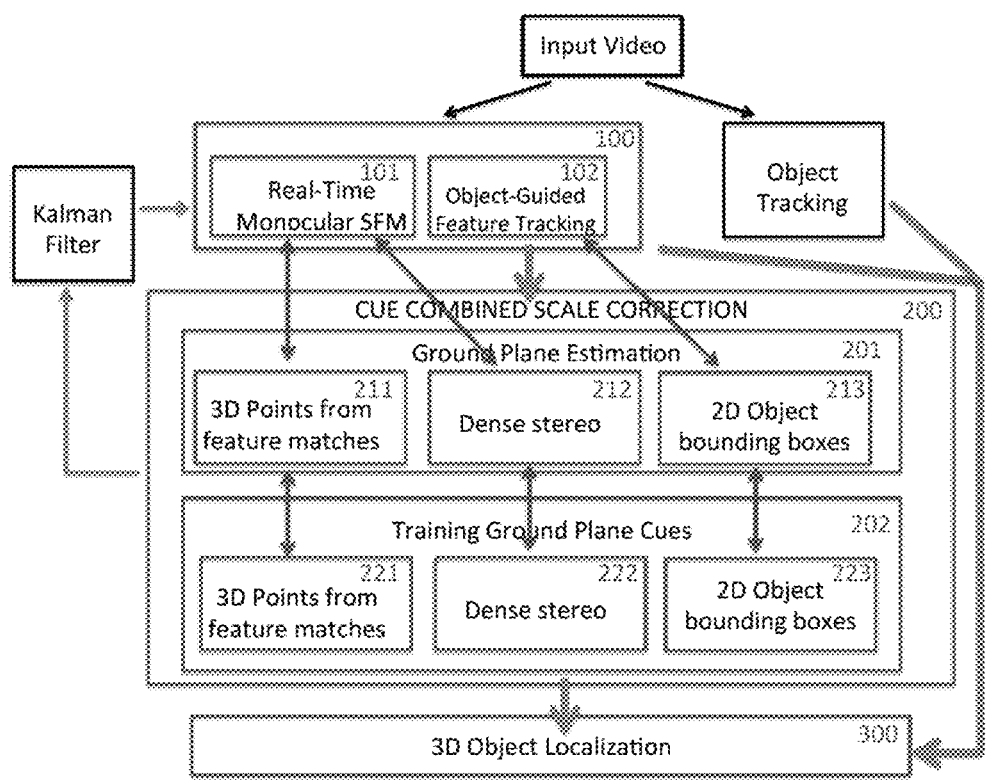
FIG. 1 shows one embodiment of a real-time SFM system.

FIG. 1 shows one embodiment of a real-time SFM system 100 to process input video. The system of FIG. 1 performs the following:
(a) correct the scale drift in monocular SFM using a novel cue combination framework.
(b) design several cues to estimate the ground plane height for scale correction.
(c) design a general data-driven cue combination framework that is flexible enough to handle various cues.
(d) learn specific models that indicate the relative effectiveness of each cue for use in the above cue combination framework.
(e) combine monocular SFM, ground plane estimation and object tracking in an efficient, real-time framework for highly accurate localization of both the camera and 3D objects in the scene.

The system 100 includes a real-time monocular SFM and object localization module 101 that can handle moving objects without expensive motion segmentation and that is far more accurate than prior works due to a high-accuracy scale correction using a novel cue combination framework for ground plane estimation. The system uses the ground plane estimates to determine the vanishing point in road scenes. This is used to determine the epipolar search range and constrain the size of matching windows, leading to greater accuracy in highway scenes where speeds are higher. The system includes an object-guided feature tracking module 102. Features are tracked on the object using a dense optical flow that exploits the epipolar geometry constraints from monocular SFM.

The object guided feature tracking 102 communicates with a cue-combined scale correction module 200. Scale drift is the most important challenge in monocular SFM. We solve it by estimating camera height above the ground in a novel cue combination framework. This framework combines cues from 3D points, dense stereo and 2D object bounding boxes. The relative importance of each cue is adjusted on a per-frame basis, based on visual data, using a novel framework to learn models that relate observation covariance to error in underlying variables.

A ground plane estimation framework 201 is proposed that uses cues from many sources, like 3D points, dense stereo and 2D object bounding boxes. The frame work 201 includes a module 211 (FIG. 3) to estimate the ground plane from 3D points arising from sparse feature matches on the road surface. A dense stereo processing module 212 (FIG. 4) estimates the ground plane from dense stereo between successive frames for a planar region immediately in front of the car, whose images are related by a homography mapping. A 2D object bounding box detection module 213 (FIG. 5) estimates the ground plane based on the 2D bounding box heights and a prior on the 3D object height.

The ground plane estimation module 201 communicates with a training ground plane cues module 202 (FIG. 2) which learns models from training data to relate the expected belief in the effectiveness of a cue to the observed visual data, on a per-frame basis. In learning module 201, a learning module 221 (FIG. 6) receives from module 211 (FIG. 3) and learns models from training data to relate the expected belief in the effectiveness of the 3D points cue to the observed visual data, on a per-frame basis. A dense stereo learning module 222 (FIG. 7) receives dense stereo from module 212 and learns models from training data to relate the expected belief in the effectiveness of the dense stereo cue to the observed visual data, on a per-frame basis. A 2D object bounding box learning module 223 (FIG. 8) receives 2D object bounding boxes from module 213 (FIG. 5) and learns models from training data to relate the expected belief in the effectiveness of the 2D object bounding boxes cue to the observed visual data, on a per-frame basis. The cue combined scale correction module 200 is provided to a Kalman filter whose output is provided to the a real-time monocular SFM 101.

A 3D localization module 300 combines information from monocular SFM, ground plane estimation and object tracking to produce highly accurate 3D bounding boxes around the object, in real-time.

The system of FIGS. 1-8 provides a data-driven framework that combines multiple cues for ground plane estimation using learned models to adaptively weight per-frame observation covariances. Highly accurate, robust, scale-corrected and real-time monocular SFM with performance comparable to stereo. The use of detection cues for ground estimation boosts 3D object localization accuracy.

Next, the details of one implementation are discussed. We denote a vector in $R^n$ as $x = (x_1, \ldots, x_n)^T$. A matrix is denoted as X. A variable x in frame k of a sequence is denoted as $x^k$.

As shown in FIG. 9, the camera height (also called ground height) h is defined as the distance from the principal center to the ground plane. Usually, the camera is not perfectly parallel to the ground plane and there exists a non-zero pitch angle $\theta$. The ground height h and the unit normal vector $n = (n_1, n_2, n_3)^T$ define the ground plane. For a 3D point $(X,Y,Z)^T$ on the ground plane, $$h = Y \cos \theta - Z \sin \theta. \qquad (1)$$

Scale drift correction is an integral component of monocular SFM. In practice, it is the single most important aspect that ensures accuracy. We estimate the height and orientation of the ground plane relative to the camera for scale correction. Under scale drift, any estimated length l is ambiguous up to a scale factor $s = l/l^*$, where $l^*$ is the ground truth length. The objective of scale correction is to compute s. Given the calibrated height of camera from ground $h^*$, computing the apparent height h yields the scale factor $s = h/h^*$. Then the camera translation t can be adjusted as $t_{new} = t/s$, thereby correcting the scale drift. In Section 4, we describe a novel, highly accurate method for estimating the ground height h and orientation n using an adaptive cue combination mechanism.

Accurate estimation of both ground height and orientation is crucial for 3D object localization. Let K be the camera intrinsic calibration matrix. The bottom of a 2D bounding box, $b = (x,y,1)^T$ in homogeneous coordinates, can be back-projected to 3D through the ground plane $\{h,n\}$:

$$B = (B_x, B_y, B_z)^T = -\frac{hK^{-1}b}{n^T K^{-1} b}, \qquad (2)$$

Similarly, the object height can also be obtained using the estimated ground plane and the 2D bounding box height.

Given 2D object tracks, one may estimate best-fit 3D bounding boxes. The object pitch and roll are determined by the ground plane (see FIG. 0). For a vehicle, the initial yaw angle is assumed to be its direction of motion and a prior is imposed on the ratio of its length and width. Given an initial position from (2), a 3D bounding box can be computed by minimizing the difference between its reprojection and the tracked 2D bounding box.

We defer a detailed description of object localization to future work, while noting two points. First, an accurate ground plane is clearly the key to accurate monocular localization, regardless of the actual localization framework. Second, incorporating cues from detection bounding boxes into the ground plane estimation constitutes an elegant feedback mechanism between SFM and object localization.

To combine estimates from various methods, a Kalman filter is used:

$$x^k = Ax^{k-1} + w^{k-1}, p(w):N(0,Q),$$

$$z^k = Hx^k + v^{k-1}, p(v):N(0,U), \quad (3)$$

In our application, the state variable in (3) is the ground plane, thus, $x=(n^T, h)^T$. Since $|n|=1$, $n_2$ is determined by $n_1$ and $n_3$ and our observation is $z=(n_1, n_3, h)^T$. Thus, our state transition matrix and the observation model are given by $$A = \begin{bmatrix} R & t \\ 0^T & 1 \end{bmatrix}^T, H = \begin{bmatrix} 1 & 0 & 0 & 0 \\ 0 & 0 & 1 & 0 \\ 0 & 0 & 0 & 1 \end{bmatrix}. \quad (4)$$

Suppose methods $i=1,\ldots,m$ are used to estimate the ground plane, with observation covariances $U_j$. Then, the fusion equations at time instant k are $$U^k = \left(\sum_{i=1}^m (U_i^k)^{-1}\right)^{-1}, z^k = U^k \sum_{i=1}^m (U_i^k)^{-1} z_i^k. \quad (5)$$

Meaningful estimation of $U^k$ at every frame, with the correctly proportional $U_i^k$ for each cue, is essential for principled cue combination. Traditionally, fixed covariances are used to combine cues, which does not account for per-frame variation in their effectiveness across a video sequence. In contrast, in the following sections, we propose a data-driven mechanism to learn models to adapt per-frame covariances for each cue, based on error distributions of the underlying variables.

The system uses multiple methods like triangulation of sparse feature matches, dense stereo between successive frames and object detection bounding boxes to estimate the ground plane. The cues provided by these methods are combined in a principled framework that accounts for their per-frame relative effectiveness.

In an embodiment with Plane-Guided Dense Stereo, a region of interest (ROI) in the foreground (middle fifth of the lower third of the image) corresponds to a planar ground. For a hypothesized value of $\{h,n\}$ and relative camera pose $\{R,t\}$ between frames k and k+1, a per-pixel mapping can be computed using the homography matrix $$G = R + \frac{1}{h} t n^T. \quad (6)$$

Note that t differs from the true translation t* by an unknown scale drift factor, encoded in the h we wish to estimate. Pixels in frame k+1 are mapped to frame k (subpixel accuracy is important for good performance) and the sum of absolute differences (SAD) is computed over bilinearly interpolated image intensities. With $\rho=1.5$, a Nelder-Mead simplex routine is used to estimate the $\{h,n\}$ that minimize:

$$\min_{h,n}(1 - \rho^{-SAD}). \quad (7)$$

Note that the optimization only involves $h, n_1$ and $n_3$, since PnP=1. Enforcing the norm constraint has marginal effect, since the calibration pitch is a good initialization and the cost function usually has a clear local minimum in its vicinity. The optimization requires about 10 ms per frame. The $\{h,n\}$ that minimizes (7) is the estimated ground plane from stereo cue.

Next, we consider matched sparse SIFT descriptors between frames k and k+1, computed within the above region of interest (we find SIFT a better choice than ORB for the low-textured road and real-time performance is attainable for SIFT in the small ROI). To fit a plane through the triangulated 3D points, one option is to estimate $\{h,n\}$ using a 3-point RANSAC for plane-fitting. However, in our experiments, better results are obtained by assuming the camera pitch to be fixed from calibration. For every triangulated 3D point, the height h is computed using (1). The height difference $\Delta h_{ij}$ is computed for every 3D point i with respect to every other point j. The estimated ground plane height is the height of the point i corresponding to the maximal score q, where $$-0.05 \ln q = \max_i \left\{ \sum_{j \neq i} \exp(-\mu \Delta h_{ij}^2) \right\} \text{with } \mu = 50. \quad (8)$$

The system can also use object detection bounding boxes as cues when they are available, for instance, within the object localization application. The ground plane pitch angle $\theta$ can be estimated from this cue. Recall that $n_3 = \sin\theta$, for the ground normal $n=(n_1, n_2, n_3)^T$. From (2), given the 2D bounding box, we can compute the 3D height $h_b$ of an object through the ground plane. Given a prior height $\overline{h_b}$ of the object, $n_3$ is obtained by solving:

$$\min_{n_3}(h_b - \overline{h_b})^2. \quad (9)$$

The ground height h used in (2) is set to the calibration value to avoid incorporating SFM scale drift and $n_1$ is set to 0 since it has negligible effect on object height.

Note: Object bounding box cues provide us unique long distance information, unlike dense stereo and 3D points cues that only focus on an ROI close to our vehicle. An inaccurate pitch angle can lead to large vertical errors for far objects. Thus, the 3D localization accuracy of far objects is significantly improved by incorporating this cue.

Data-Driven Cue Combination is discussed next to combine the above cues while reflecting the per-frame relative accuracy of each. Naturally, the combination should be influenced by both the visual input at a particular frame and prior knowledge. We achieve this by learning models from training data to relate the observation covariance for each cue to error behaviors of its underlying variables. During testing, our learned models adapt each cue's observation covariance on a per-frame basis.

For the dense stereo and 3D points cues, we use the KITTI visual odometry dataset for training, consisting of F=23201 frames. Sequences 0 to 8 of the KITTI tracking dataset are used to train the object detection cue. To determine the ground truth h and n, we label regions of the image close to the camera that are road and fit a plane to the associated 3D points from the provided Velodyne data. No labelled road regions are available or used during testing.

Each method i has a scoring function $f_i$ that can be evaluated for various positions of the ground plane variables $\pi=\{h, n\}$. The functions $f_i$ for stereo, 3D points and object cues are given by (7), (8) and (9), respectively. Then, Algorithm 1 is a general description of the training ---
Algorithm 1 Data-Driven Training for Cue Combination
--- for Training frames k = 1 : F do
- For various values of $\pi = \{h, n\}$, fit a model $A_i^k$ to observations $(\pi, f_i(\pi))$. Parameters $a_i^k$ of model $A_i^k$ reflect belief in accuracy of cue i at frame k. (For instance, when A is a Gaussian, a can be its variance.)
- Compute error $e_i^k = |\arg\min_\pi f_i(\pi) - \pi^{*k}|$, where the ground truth ground plane in frame k is $\pi^{*k}$.

end for
- Quantize model parameters $a_i^k$, for k = 1, ..., F, into L bins centered at $c_i^1, ..., c_i^L$.
- Histogram the errors $e_i^k$ according to quantized $c_i^l$. Let $v_i^l$ be the bin variances of $e_i^k$, for l = 1, ..., L.
- Fit a model $C_i$ to observations $(c_i^l, v_i^l)$.

---

Intuitively, the parameters $a_i^k$ of model $A_i^k$ reflect belief in the effectiveness of cue i at frame k. Quantizing the parameters $a_i^k$ from F training frames into L bins allows estimating the variance of observation error at bin centers $c_i^l$. The model $C_i$ then relates these variances, $v_i^l$, to the cue's accuracy (represented by quantized parameters $c_i^l$). Thus, at test time, for every frame, we can estimate the accuracy of each cue i based purely on visual data (that is, by computing $a_i$) and use the model $C_i$ to determine its observation variance.

Now we describe the specifics for training the models A and C for each of dense stereo, 3D points and object cues. We will use the notation that $i \in \{s, p, d\}$, denoting the dense stereo, 3D points and object detection methods, respectively.

The error behavior of dense stereo between two consecutive frames is characterized by variation in SAD scores between road regions related by the homography (6), as we independently vary each variable h, $n_1$ and $n_3$. The variance of this distribution of SAD scores represents the error behavior of the stereo cue with respect to its variables. Recall that the scoring function for stereo, $f_s$, is given by (7). We assume that state variables are uncorrelated. Thus, we will learn three independent models corresponding to h, $n_1$ and $n_3$.

For a training image k, let $\{\hat{h}^k, \hat{n}^k\}$ be the ground plane estimated by the dense stereo method, by optimizing $f_s$ in (7). We first fix $n_1 = \hat{n}_1^k$ and $n_3 = \hat{n}_3^k$ and for 50 uniform samples of h in the range $[0.5\hat{h}^k, 1.5\hat{h}^k]$, construct homography mappings from frame k to k+1, according to (6) (note that R and t are already estimated by monocular SFM, up to scale). For each homography mapping, we compute the SAD score $f_s(h)$ using (7). A univariate Gaussian is now fit to the distribution of $f_s(h)$. Its variance, $a_{s,h}^k$, captures the sharpness of the SAD distribution, which reflects belief in accuracy of height h estimated from the dense stereo method at frame k. A similar procedure yields variances $a_{s,n_1}^k$ and $a_{s,n_3}^k$ as corresponding to orientation variables. Example fits are shown in FIG. 2.

Referring to Algorithm 1 above, $a_{s,h}^k, a_{s,n_1}^k, a_{s,n_3}^k$ are precisely the parameters $a_s^k$ that indicate accuracy of the stereo cue at frame k.

The Learning of the model $C_s$ is detailed next. For frame k, let $e_{s,h}^k = |\hat{h}^k - h^{*k}|$ be the error in ground height, relative to ground truth. We quantize the parameters $a_{s,h}^k$ into L=100 bins and consider the resulting histogram of $e_{s,h}^k$. The bin centers $c_{s,h}^l$ are positioned to match the density of $a_{s,h}^k$ (that is, we distribute F/L errors $e_{s,h}^k$ within each bin). A similar process is repeated for $n_1$ and $n_3$. The histograms for the KITTI dataset are shown in FIG. 3. We have now obtained the $c_s^l$ of Algorithm 5.1.

Next, we compute the variance $v_{s,h}^l$ of the errors within each bin l, for l=1, ..., L. This indicates the observation error variance. We now fit a curve to the distribution of $v_{s,h}$ versus $c_{s,h}$, which provides a model to relate observation variance in h to the effectiveness of dense stereo. The result for the KITTI dataset is shown in FIG. 4, where each data point represents a pair of observation error covariance $v_{s,h}^l$ and parameter $c_{s,h}^l$. Empirically, we observe that a straight line suffices to produce a good fit. A similar process is repeated for $n_1$ and $n_3$. Thus, we have obtained models $C_s$ (one each for h, $n_1$ and $n_3$) for the stereo method.

Similar to dense stereo, the objective of training is again to find a model that relates the observation covariance of the 3D points method to the error behavior of its underlying variables. Recall that the scoring function $f_p$ is given by (8).

We observe that the score q returned by $f_p$ is directly an indicator of belief in accuracy of the ground plane estimated using the 3D points cue. Thus, for Algorithm 5.1, we may directly obtain the parameters $a_p^k = q^k$, where $q^k$ is the optimal value of $f_p$ at frame k, without explicitly learning a model $A_p$.

The remaining procedure mirrors that for the stereo cue. Let $\hat{h}_p^k$ be ground height estimated at frame k using 3D points, that is, the optimum for (8). The error $e_{p,h}^k$ is computed with respect to ground truth. The above $a_{p,h}^k$ are quantized into L=100 bins centered at $c_{p,h}^l$ and a histogram of observation errors $e_{p,h}^k$ is constructed. A model $C_p$ may now be fit to relate the observation variances $v_{p,h}^l$ at each bin to the corresponding accuracy parameter $c_{p,h}^l$. As shown in FIG. 4, a straight line fit is again reasonable.

We assume that the detector provides several candidate bounding boxes and their respective scores (that is, bounding boxes before the nonmaximal suppression step of traditional detectors). A bounding box is represented by $b=(x,y,w,h_b)^T$, where x, y is its 2D position and w,$h_b$ are its width and height. The error behavior of detection is quantified by the variation of detection scores $\alpha$ with respect to bounding box b.

Our model $A_d^k$ is a mixture of Gaussians. At each frame, we estimate 4×4 full rank covariance matrices $\Sigma_m$ centered at $\mu_m$, as:

$$\min_{A_m, \mu_m, \Sigma_m} \sum_{n=1}^{N} \left( \sum_{m=1}^{M} A_m e^{-\frac{1}{2}\varepsilon_{mn} \Sigma_m^{-1} \varepsilon_{mn}} - \alpha_n \right)^2, \quad (10)$$

where $\varepsilon_{mn} = b_n - \mu_m$, M is number of objects and N is the number of candidate bounding boxes (the dependence on k has been suppressed for convenience). Example fitting results are shown FIG. 6. It is evident that the variation of noisy detector scores is well-captured by the model $A_d^k$.

Recall that the scoring function $f_d$ of (9) estimates $n_3$. Thus, only the entries of $\Sigma_m$ corresponding to y and $h_b$ are significant for our application. Let $\sigma_y$ and $\sigma_{h_b}$ be the corresponding diagonal entries of the $\Sigma_m$ closest to the tracking 2D box. We combine them into a single parameter, $$a_d^k = \frac{\sigma_y \sigma_{h_b}}{\sigma_y + \sigma_{h_b}},$$

which reflects our belief in the accuracy of this cue.

The remaining procedure is similar to that for the stereo and 3D points cues. The accuracy parameters $a_d^k$ are quantized and related to the corresponding variances of observation errors, given by the $f_d$ of (9). The fitted linear model $C_d$ that relates observation variance of the detection cue to its expected accuracy is shown in FIG. 6.

During testing, at every frame k, we fit a model $A_i^k$ corresponding to each cue i∈{s,p,d} and determine its parameters $a_i^k$ that convey expected accuracy. Next, we use the models $C_i$ to determine the observation variances.

The observation $z_s^k=(n_1^k, n_3^k, h^k)^T$ at frame k is obtained by minimizing $f_s$, given by (7). We fit 1D Gaussians to the homography-mapped SAD scores to get the values of $a_{s,h}^k$, $a_{s,n_1}^k$ and $a_{s,n_3}^k$. Using the models $C_s$ estimated in FIG. 4, we predict the corresponding variances $v_s^k$. The observation covariance for the dense stereo method is now available as $U_l^k = \text{diag}(v_{s,n_1}^k, v_{s,n_3}^k, v_{s,h}^k)$.

At frame k, the observation $z_p^k$ is the estimated ground height h obtained from $f_p$, given by (8). The value of $q^k$ obtained from (8) directly gives us the expected accuracy parameter $a_p^k$. The corresponding variance $v_{p,h}^k$ is estimated from the model $C_p$ of FIG. 4. The observation covariance for this cue is now available as $U_p^k = v_{p,h}^k$.

At frame k, the observation $z_d^{k,m}$ is the ground pitch angle $n_3$ obtained by minimizing $f_d$, given by (9), for each object m=1, . . . , M. For each object m, we obtain the parameters $a_d^{k,m}$ after solving (10). Using the model $C_d$ of FIG. 6, we predict the corresponding error variances $v_d^{k,m}$. The observation covariances for this method are now given by $U_d^{k,m} = v_d^{k,m}$.

Finally, the adaptive covariance for frame k, $U^k$, is computed by combining $U_s^k$, $U_p^k$ and the $U_d^{k,m}$ from each object m. Then, our adaptive ground plane estimate $z^k$ is computed by combining $z_s^k$, $z_p^k$ and $z_d^{k,m}$, using (5).

Thus, the ground plane estimation method uses models learned from training data to adapt the relative importance of each cue—stereo, 3D points and detection bounding boxes—on a per-frame basis. In consideration of real-time performance, only the dense stereo and 3D points cues are used for monocular SFM. Detection bounding box cues are used for the object localization application where they are available.

The instant system's accurate ground plane estimation allows monocular vision-based systems to achieve performance similar to stereo. In particular, we have shown that it is beneficial to include cues such as dense stereo and object bounding boxes for ground estimation, besides the traditional sparse features used in prior works. Further, we proposed a mechanism to combine those cues in a principled framework that reflects their per-frame relative confidences, as well as prior knowledge from training data.

Our robust and accurate scale correction is a significant step in bridging the gap between monocular and stereo SFM. We believe this has great benefits for autonomous driving applications. We demonstrate that the performance of real-time monocular SFM that uses our ground plane estimation is comparable to stereo on real-world driving sequences. Further, our accurate ground plane easily benefits existing 3D localization frameworks, as also demonstrated by our experiments.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 10:
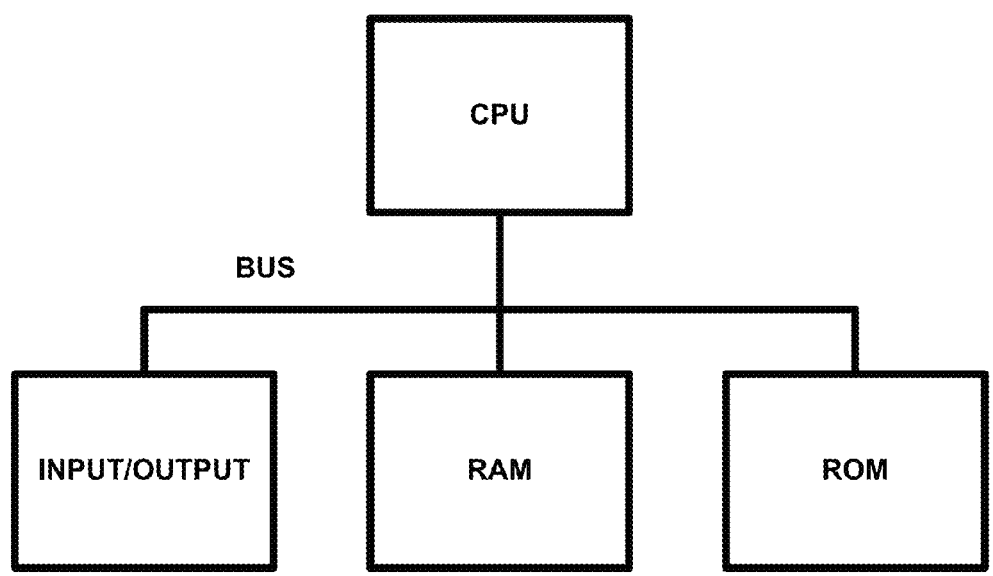
FIG. 10 shows a computer system for executing the processes of FIGS. 1-8.

By way of example, a block diagram of a computer to support the system is discussed in FIG. 10. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for performing three-dimensional (3D) localization requiring only a single camera, comprising:
    capturing images from only one camera;
    generating a cue combination from sparse features, dense stereo and object bounding boxes;
    correcting for scale in monocular structure from motion (SFM) using the cue combination for estimating a ground plane;

performing localization by combining SFM, ground plane and object bounding boxes to produce a 3D object localization, and back-projecting through a ground plane $\{h,n\}$:

$$B = (B_x, B_y, B_z)^T = -\frac{hK^{-1}b}{n^T K^{-1}b},$$

where K is a camera intrinsic calibration matrix and $b=(x, y, 1)^T$ is a bottom of a 2D bounding box in homogeneous coordinates.

2. The method of claim 1, comprising combining monocular real-time SFM, a cue combination and object tracking for 3D localization.

3. The method of claim 1, comprising with tracked bounding boxes, determining regions of an image that are background (non-moving objects) and using monocular SFM to estimate a camera pose and the ground plane.

4. The method of claim 1, comprising performing a dense optical flow estimation on the object.

5. The method of claim 1, comprising estimating the ground plane using 3D points, dense stereo and 2D object bounding boxes.

6. The method of claim 1, comprising learning one or more models that indicate per-frame relative importance of cues.

7. The method of claim 1, comprising combining ground plane estimates within a Kalman filter.

8. The method of claim 1, comprising applying an estimated ground plane to correct a monocular SFM scale drift.

9. The method of claim 8, wherein the estimated ground plane is used to find a 3D bounding box that encloses the object.

10. The method of claim 1, comprising performing autonomous driving and driving safety with the 3D localization.

11. A vehicle, comprising:
a single camera;
a motor coupled to the single camera for moving the vehicle; and
means for three-dimensional (3D) localization of traffic participants including vehicles or pedestrians, said means including:
means for generating a cue combination from sparse features, dense stereo and object bounding boxes;
means for correcting for scale in monocular structure from motion (SFM) using the cue combination for estimating a ground plane;
means for performing localization by combining SFM, ground plane and object bounding boxes to produce a 3D object localization, and back-projecting through a ground plane $\{h,n\}$:

$$B = (B_x, B_y, B_z)^T = -\frac{hK^{-1}b}{n^T K^{-1}b},$$

where K is a camera intrinsic calibration matrix and $b=(x, y, 1)^T$ is a bottom of a 2D bounding box in homogeneous coordinates.

12. The method of claim 1, wherein methods $i=1,\ldots,m$ are used to estimate a ground plane, with observation covariances $U_j$, comprising determining fusion at time instant k as:

$$U^k = \left(\sum_{i=1}^m (U_i^k)^{-1}\right)^{-1}, z^k = U^k \sum_{i=1}^m (U_i^k)^{-1} z_i^k.$$

13. The method of claim 1, comprising determining Plane-Guided Dense Stereo, including determing a region of interest (ROI) in a foreground corresponding to a planar ground.

14. The method of claim 13, for a value of $\{h,n\}$ and a relative camera pose $\{R, t\}$ between frames k and k+1, comprising determining a per-pixel mapping using a homography matrix $$G = R + \frac{1}{h}tn^T.$$

15. A method for performing three-dimensional (3D) localization of traffic participants including vehicles or pedestrians, requiring only a single camera, comprising:
capturing images from only one camera;
generating a cue combination from sparse features, dense stereo and object bounding boxes
correcting for scale in monocular structure from motion (SFM) using the cue combination for estimating a ground plane;
performing localization by combining SFM, ground plane and object bounding boxes to produce a 3D object localization, and
back-projecting through a ground plane $\{h,n\}$:

$$B = (B_x, B_y, B_z)^T = -\frac{hK^{-1}b}{n^T K^{-1}b},$$

where K is a camera intrinsic calibration matrix and $b=(x, y, 1)^T$ is a bottom of a 2D bounding box in homogeneous coordinates.

16. The method of claim 15, comprising combining monocular real-time SFM, a cue combination and object tracking for 3D localization.

17. The method of claim 15, comprising with tracked bounding boxes, determining regions of an image that are background (non-moving objects) and using monocular SFM to estimate a camera pose and the ground plane.

18. The method of claim 15, comprising performing a dense optical flow estimation on the object.

19. The method of claim 15, comprising estimating the ground plane using 3D points, dense stereo and 2D object bounding boxes.

20. A method for performing three-dimensional (3D) localization requiring only a single camera, comprising:
capturing images from only one camera;
generating a cue combination from sparse features, dense stereo and object bounding boxes;
correcting for scale in monocular structure from motion (SFM) using the cue combination for estimating a ground plane;
performing localization by combining SFM, ground plane and object bounding boxes to produce a 3D object localization
wherein methods $i=1,\ldots,m$ are used to estimate a ground plane, with observation covariances $U_j$, comprising determining fusion at time instant k as:

$$U^k = \left(\sum_{i=1}^{m}(U_i^k)^{-1}\right)^{-1}, \quad z^k = U^k \sum_{i=1}^{m}(U_i^k)^{-1} z_i^k.$$

21. A method for performing three-dimensional (3D) localization of traffic participants including vehicles or pedestrians, requiring only a single camera, comprising:
    capturing images from only one camera;
    generating a cue combination from sparse features, dense stereo and object bounding boxes
    correcting for scale in monocular structure from motion (SFM) using the cue combination for estimating a ground plane; and
    performing localization by combining SFM, ground plane and object bounding boxes to produce a 3D object localization, wherein methods i=1,...,m are used to estimate a ground plane, with observation covariances $U_j$, comprising determining fusion at time instant k as:

$$U^k = \left(\sum_{i=1}^{m}(U_i^k)^{-1}\right)^{-1}, \quad z^k = U^k \sum_{i=1}^{m}(U_i^k)^{-1} z_i^k.$$

22. A vehicle, comprising:
    a single camera;
    a motor coupled to the single camera for moving the vehicle; and
    means for for three-dimensional (3D) localization of traffic participants including vehicles or pedestrians, said means including:
    means for generating a cue combination from sparse features, dense stereo and object bounding boxes;
    means for correcting for scale in monocular structure from motion (SFM) using the cue combination for estimating a ground plane;
    means for performing localization by combining SFM, ground plane and object bounding boxes to produce a 3D object localization, and
    wherein methods i=1,...,m are used to estimate a ground plane, with observation covariances $U_j$, comprising determining fusion at time instant k as:

$$U^k = \left(\sum_{i=1}^{m}(U_i^k)^{-1}\right)^{-1}, \quad z^k = U^k \sum_{i=1}^{m}(U_i^k)^{-1} z_i^k.$$

* * * * *